April 25, 1950   F. F. SUELLENTROP   2,505,439
APPARATUS FOR MANUFACTURING WHIPPED CREAM
Filed April 26, 1949   3 Sheets-Sheet 1
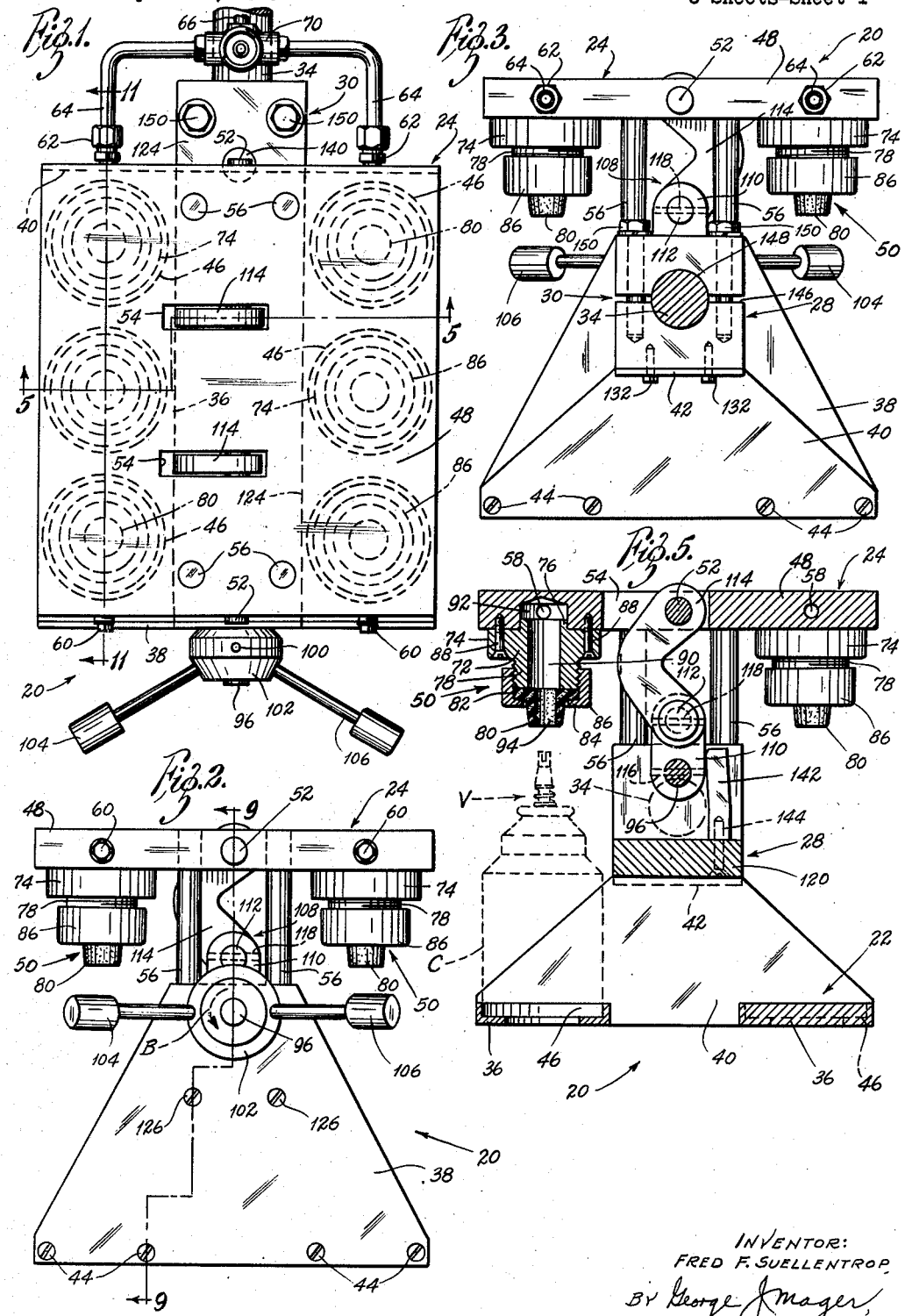

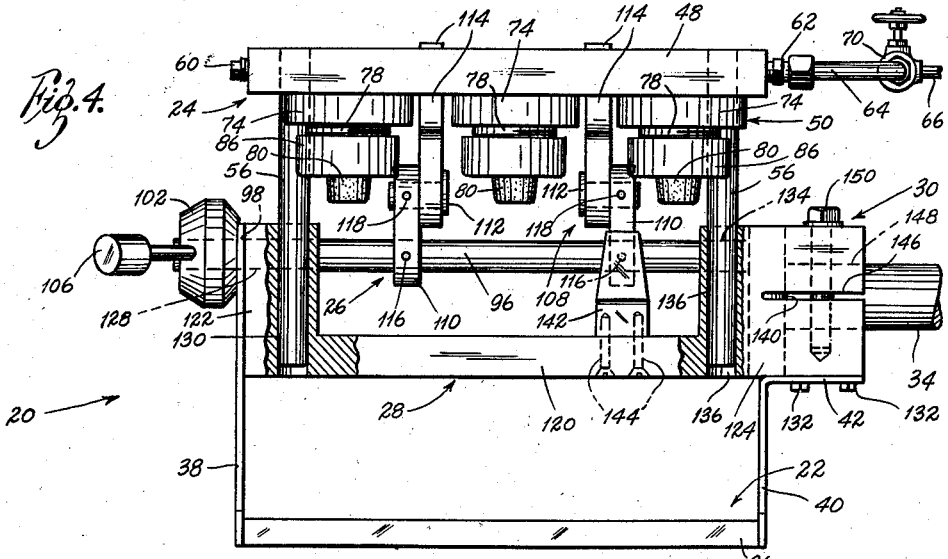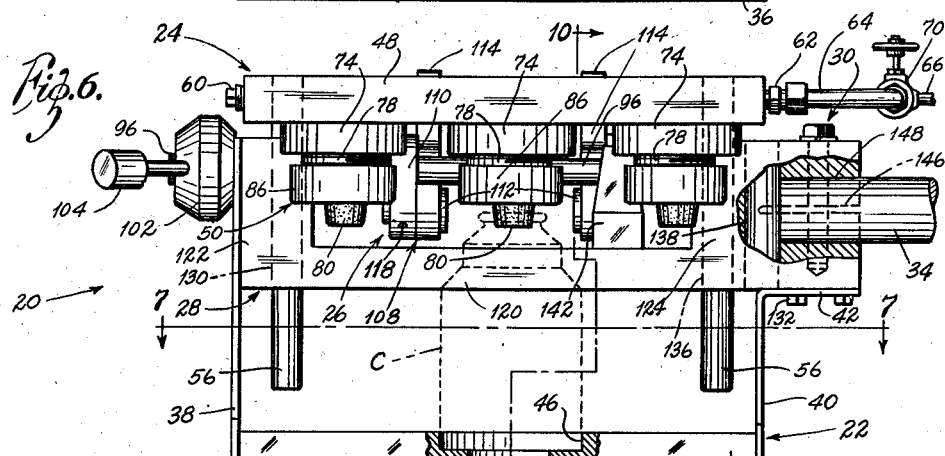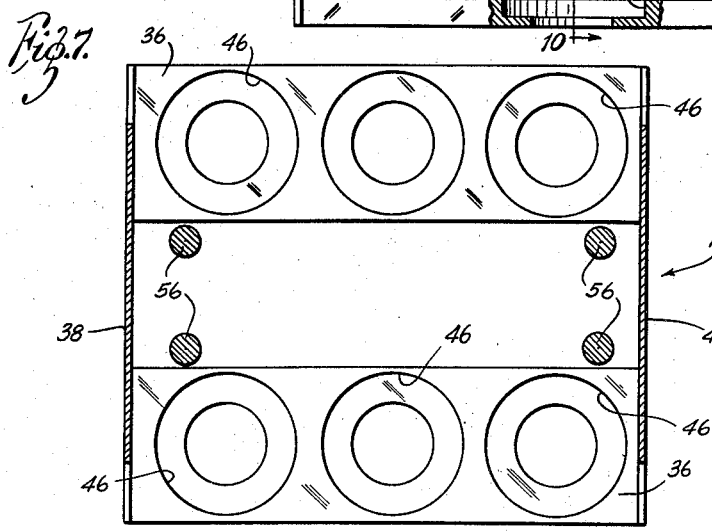

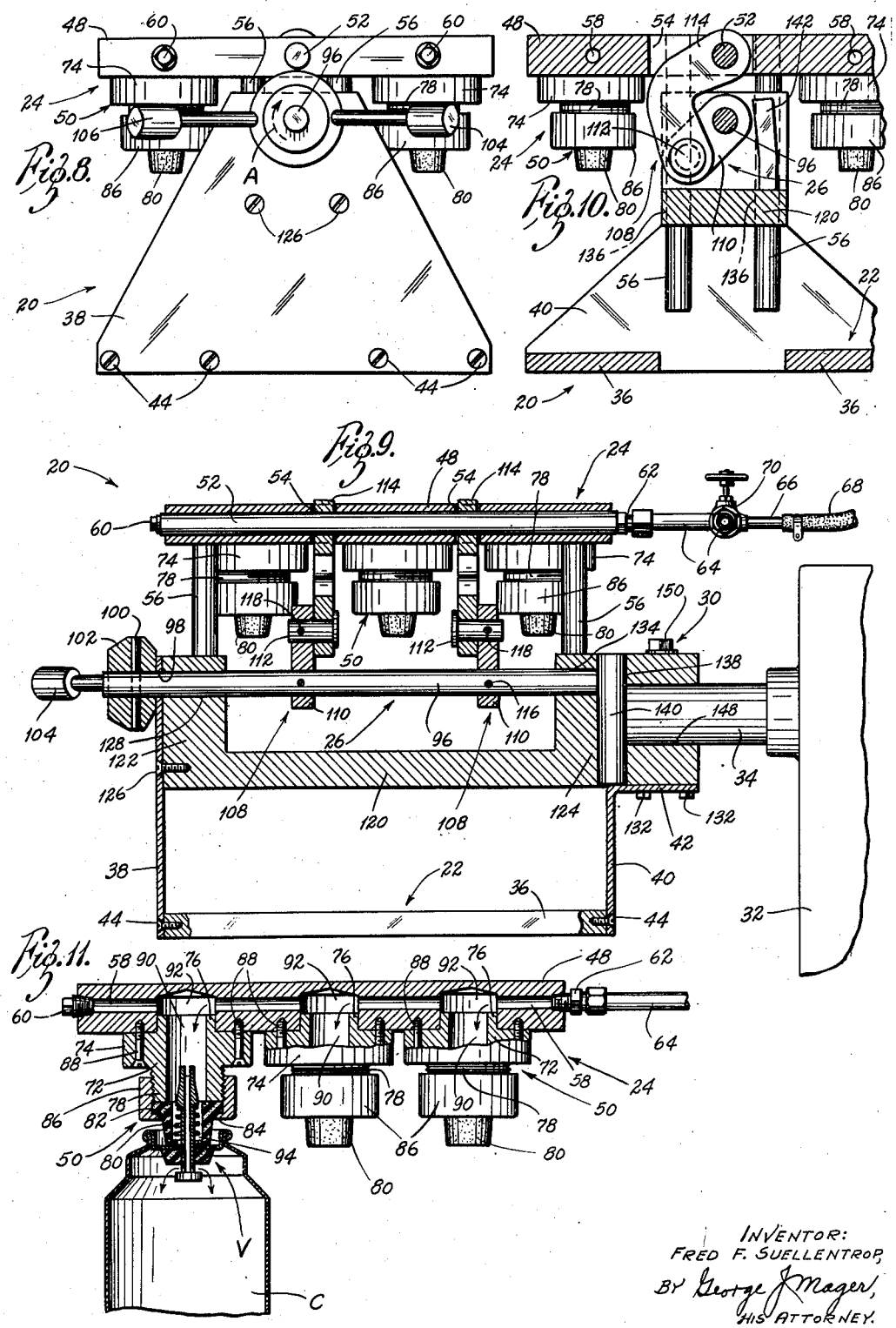

Patented Apr. 25, 1950

2,505,439

UNITED STATES PATENT OFFICE 2,505,439

APPARATUS FOR MANUFACTURING WHIPPED CREAM

Fred F. Suellentrop, Lemay, Mo., assignor to Lemay Machine Company, Lemay, Mo., a corporation of Missouri Application April 26, 1949, Serial No. 89,604

6 Claims. (Cl. 226—72)

The present invention relates generally to the manufacture of whipped cream for domestic consumption.

In my pending application filed March 7, 1949, Serial Number 80,038, there is disclosed a novel method of, and apparatus for, sealing within a self-dispensing container, a predetermined quantity of whipped cream.

The present invention contemplates no change in the method set forth in said application, but does provide novel apparatus for practising the method on a comparatively smaller scale.

In other words, whereas the apparatus of the said pending application is designed for mass production on a large scale, and includes a motor driven assembly for simultaneously reciprocating at least sixteen cream containers, the present invention comprises a novel device adapted for attachment to a rotary shaft, and is specifically designed for simultaneously reciprocating but six such containers.

Stated otherwise, the apparatus disclosed in said application is designed for use in large dairies and cream plants, whereas the apparatus comprising the present invention is designed for use in small dairies.

It is noted however, that the primary objective of this invention, that is the production of whipped cream releasably sealed within a self-dispensing container, is the same as that set forth in the application aforesaid, and that the containers herein referred to are likewise of the type disclosed in the co-pending application of Aaron S. Lapin, Serial Number 6,767, filed February 6, 1948.

In a general summary, the present invention may be said to include a compact device provided with means for clamping same to a shaft, means for the reception and retention of cream containers, means for introducing gas under pressure into each container simultaneously with the reciprocation thereof, means for controlling the supply of gas, and manually operable means for facilitating the insertion and removal of said containers.

A more comprehensive description follows, reference being had also to the drawings wherein is illustrated the preferred embodiment of the invention.

In said drawings:

Fig. 1 is a top plan view of the invention as it appears when in position for the reception of containers;

Fig. 2 is a front elevational view thereof;

Fig. 3 is a rear elevational view thereof;

Fig. 4 is a right side elevational view thereof;

Fig. 5 is a vertical sectional view taken on the line 5—5 of Fig. 1;

Fig. 6 is a view similar to Fig. 4, but partly in section, the device being shown in position for the retention of containers during reciprocations thereof;

Fig. 7 is a horizontal sectional view taken on line 7—7 in Fig. 6;

Fig. 8 is a view similar to Fig. 2, the device being shown in a position corresponding to that of Fig. 6;

Fig. 9 is a central longitudinal section taken on line 9—9 of Fig. 2;

Fig. 10 is a vertical sectional view taken on line 10—10 in Fig. 6;

Fig. 11 is a similar view taken on line 11—11 in Fig. 1, the device however being in a position corresponding to that of Figs. 6 and 10, and the view also including a central vertical sectional illustration of the upper portion of a container.

The apparatus comprising the invention is indicated as a whole by numeral 20. It includes a container receiving assembly generally designated 22; a combined container retaining and gas distribution assembly 24; a manually operable shaft and linkage associated therewith, for selectively elevating or lowering the assembly 24, and which is generally designated 26; a guide assembly 28 for supporting the last named assembly; and means, generally indicated 30, whereby the entire apparatus may be rigidly attached to the end of a reciprocatory shaft.

The shaft herein referred to, is of the type that projects from a device which incorporates means for imparting endwise and coaxial rotary reciprocations to the shaft.

Thus, for example, the agitating device of Patent No. 2,109,233, issued to Arthur P. Jorgenson on February 22, 1938, has been found ideal for this purpose.

The device disclosed in said patent is fragmentarily shown only in Fig. 9, where it is designated by numeral 32, and wherein its projecting reciprocatory shaft is designated by numeral 34. Although said particular device, as stated, has been found ideal, it is to be understood that the apparatus comprising this invention may be clamped to any other shaft rotatably reciprocable through an arc of less than one hundred and eighty degrees, as will appear.

The assembly 22 includes a pair of spaced rectangular bed members 36, a substantially triangular front plate 38, and a similarly contoured rear plate 40. The latter is provided with an integral, rearwardly projecting shelf portion 42, and the members 36 extend between the front and rear plates to which they are secured as by screws 44.

Each bed member 36 is provided with a longitudinally alined series of spaced circular depressions or recesses 46, the diameters of which are of a size to snugly receive the lowermost portion of a container C, as portrayed in Figs. 5 and 6.

The assembly 24 includes a rectangular block 48, in the nature of a manifold, adapted to support a plurality of gas injection assemblies each generally designated by numeral 50. On the longitudinal centerline of said block, and extending therethrough from end to end thereof, is a horizontally disposed shaft 52, which preferably has a tight fit so that it is nonrotatable. Said shaft also passes through a pair of rectangular openings 54 formed in the block, as best seen in Figs. 1 and 5.

Depending from the manifold block 48, with their upper ends press-fitted thereinto, are four guide rods 56, and a pair of longitudinal bores or passageways 58, each laterally equidistant from said shaft 52, are formed in said block. At the front end, each passageway 58 is threaded to receive a plug 60, and at the rear end, to receive a suitable fitting 62 for connecting thereto one branch 64 of a gas delivery line 66.

As seen in Fig. 9, the gas line 66 has a flexible connection 68 with a supply tank which is not shown, and is provided with a manually operable valve 70 for controlling the gas supply.

With particular reference to Figs. 5 and 11, it is seen that each of the injection assemblies 50 includes an annular member 72 provided with a horizontal flange portion 74, an upwardly extending boss portion 76, and a depending externally threaded portion 78. Also included is a slightly tapered, or funnel-shaped member 80 of semi-rigid material such as rubber or the like, a peripheral flange 82 of which is compressed between the lower face of portion 78, and the inturned and apertured flange 84 of a hollow nut 86.

The member 72 is secured to the manifold block by a circular series of screws 88, and is bored throughout to provide a vertical passageway 90, in fluid communication with passageway 58 at its upper end via an annular chamber 92, and at its lower end with an outlet 94 in the member 80.

It is noted that each of the injection assemblies 50 is a counterpart of those disclosed in my said co-pending application, and that they function in the same manner.

The assembly 26 includes a rotatable shaft 96 the forward end of which passes through an opening 98 in the front plate 38, and projects therebeyond. Rigidly attached to this end of the shaft, as by a pin 100, is a knob or the like 102, from which extend, in diametrically opposite directions, handlebars 104 and 106.

Manipulation of said handlebars effects the raising or lowering of the assembly 24 through the medium of a pair of spaced linkages generally designated 108. Each said linkages includes a first link 110, a headed pivot pin 112, and a second link 114.

Link 110 is rigidly secured at one end to shaft 96 as at 116, and at its other end to pivot pin 112 as at 118. Link 114 is rotatably mounted at one end on said pivot pin, and at its other end on shaft 52, the last named end of said link being accommodated by the opening or slot 54, all as clearly shown in the drawings.

The assembly 28, which is rigidly supported by the front and rear plates, includes a generally U-shaped member comprising a horizontal web portion 120, an upwardly extending integral leg portion 122 adjacent the front plate 38, and a similar, though wider portion 124 adjacent to the rear plate 40.

The portion 122, which is secured to plate 38 as by screws 126, is horizontally apertured as at 128 to provide a bearing for the forward end portion of shaft 96, and is also vertically apertured as at 130 to provide guideways for the forward pair of depending rods 56.

Portion 124, which rests upon, and is rigidly secured, as by tap bolts 132, to the rearwardly projecting flange portion 42 of rear plate 40, is also horizontally apertured as at 134 to provide a bearing for the rearward end portion of shaft 96. It is also vertically apertured as at 136, to provide guideways for the rearward pair of depending rods 56, and similarly as at 138, to receive a press-fitted cylindrical abutment member 140 against which the rear extremity of said shaft is positioned.

With particular reference now to Figs. 4 and 5, numeral 142 indicates a vertically positioned stop member rigidly secured to the upper surface of portion 120 as by screws 144, or otherwise. Its purpose will be explained below.

The means 30, whereby the entire apparatus thus far described may be rigidly, though removably attached to the free end of a shaft projecting from an agitating device, will now be described, with attention being directed especially to Figs. 4, 6, and 9.

As illustrated, portion 124 of assembly 28 is split, or horizontally slotted as at 146, and has formed therein a horizontal annular bore 148 of a diameter adapted to snugly embrace a shaft thereinto extending.

Thus, for example, the bore 148 portrayed is of a diameter to engage shaft 36 aforesaid, the forward extremity of the latter preferably abutting member 140. Clamping screws 150 are provided to insure a rigid connection, as is understood.

Before entering into a description of the operation, a brief résumé of the method disclosed in my said co-pending application will be given. As there set forth, a predetermined quantity of high quality pasteurized cream is first introduced into each container, whereupon the latter has affixed thereto a valve assembly designated V. The cream temperature should be approximately 38 degrees Fahrenheit, and a twelve ounce container receives seven fluid ounces of cream.

Each container C and its associated valve assembly V, as hereinbefore stated, is of the type disclosed in co-pending application Serial No. 6,767, and since said valve assembly is also described in detail in my said co-pending application, it is not deemed necessary to again describe it.

The method also prescribes introduction of gas under pressure into each container, and simultaneous agitation of the contents. The gas comprises a mixture of approximately 85 per cent nitrous oxide, and fifteen per cent carbon dioxide at 90 pounds pressure, deliverable to distribution manifold 48 via flexible line 68, leading from a supply tank not shown.

Obviously, the length of time during which agitation is had, depends upon the reciprocatory rate of the shaft 34. With the invention affixed to the output shaft of the Jorgenson device, agitation for approximately sixty seconds has been found to result in a superlative product.

Operation

With the apparatus rigidly attached to shaft 34, and thus suspended thereby, it will be assumed that the assembly 24 has been raised to the elevated position thereof portrayed in Figs. 2, 3, 4, and 9. This was accomplished by manual rotation of handle bars 104 and 106 in the direction of broken line arrow A appearing in Fig. 8, whereby linkage assemblies 108 were swung from their Fig. 10 to their Fig. 5 position, as is apparent. Overtravel is obviated by the stop member 142.

A cream containing container C is now deposited into each of the recesses 46, as illustrated in Fig. 5. It is understood of course, that agitating device 32 is not in operation at this time, and that valve 70 is closed.

The attendant next rotates the handlebars in the direction indicated by broken line arrow B of Fig. 2. This action causes descent of assembly 24 until the bottom edge of each member 80 impinges against the closure member of a valve assembly V, as illustrated in Fig. 11, reference being also had to Figs. 6 and 10 in this connection.

It is noted that obviously the injection assemblies 50 are in vertical alinement with the recesses 46, so that the containers C may be said to be firmly retained in position at this time between the bed plates 36 and the assembly 24, the weight of the latter obviating displacement of said containers during the subsequent agitating operation.

The attendant now notes the time, opens valve 70, and instantaneously thereafter turns on a switch to set the agitator device in operation. After approximately 60 seconds have elapsed, the agitator switch is turned off, and immediately thereafter, valve 70 is closed.

Removal of the now processed containers is the next step, which follows rotation of the handlebars in the direction of arrow A, whereupon the reloading and processing cycle may be repeated indefinitely, as is understood.

Manifestly, the apparatus illustrated and described may be modified in some respects without departing from the principles of the invention, which is limited only by the claims set forth hereinafter.

What I claim is:

1. In an apparatus for manufacturing whipped cream, a pair of spaced bed members provided with recesses for the reception of the lowermost portions of cream containers, a manually operable vertically slidable assembly for releasably maintaining said containers in position during reciprocations thereof, said assembly including a manifold member in fluid communication with a supply of gas under presure, a manually operable valve for controlling the flow of said gas and an injection assembly for each of said containers, a horizontal bore of a diameter adapted to snugly receive the end of a reciprocatory shaft projecting from a suitable agitation device, and means for rigidly clamping said shaft end within said bore to a horizontally split portion of the apparatus aforesaid.

2. In an apparatus for manufacturing whipped cream: a pair of spaced bed members provided with recesses for the reception of the lowermost portions of cream containers; a manually operable vertically slidable assembly for releasably maintaining said containers in position during reciprocations thereof, said assembly including a rectangular block in the nature of a manifold, a pair of longitudinal passageways formed therein and extending from end to end thereof, a plug at the front end of each passageway, a plurality of gas injection assemblies attached to the underside of said block each in fluid communication with one of said passageways, a plurality of guide rods depending from said block the upper end of each rod being press-fitted thereinto; and a generally U-shaped member provided with a plurality of vertical guideways each adapted to slidably receive the lower end of one of said rods.

3. In an apparatus for manufacturing whipped cream: a pair of supporting members for a plurality of partially filled containers of cream; a vertically reciprocable assembly slidably mounted in guideways; manually operable linkage for selectively lowering said assembly into contact with a portion of said containers or elevating same thereabove, said linkage including a first link, a headed pivot pin, and a second link, the first link being rigidly secured at one end to a rotatable shaft and at the other end to said pivot pin, the second link having a pivotal connection at one end with said pivot pin and at the other end with a non-rotary horizontally disposed shaft extending through a manifold block; and an elongated slot formed in said block adapted to accommodate the upper end of the second link aforesaid.

4. In an apparatus for manufacturing whipped cream: a pair of supporting members for a plurality of partially filled containers of cream; a vertically reciprocable assembly slidably mounted in guideways provided in a substantially U-shaped horizontally disposed member; manually operable linkage for selectively lowering said assembly into contact with a portion of said containers or elevating same thereabove, said linkage including a first link, a headed pivot pin, and a second link, the first link being rigidly secured at one end to a rotatable shaft and at the other end to said pivot pin, the second link having a pivotal connection at one end with said pivot pin and at the other end with a non-rotary horizontally disposed shaft extending through a manifold block; an elongated slot formed in said block adapted to accommodate the upper end of the second link aforesaid; and an abutment member for limiting the upward travel of said reciprocable assembly, said abutment comprising a vertically positioned member rigidly secured to the upper surface of the web portion of said U-shaped member.

5. In apparatus of the character described, a generally U-shaped member comprising a horizontally disposed web portion, an upwardly extending integral leg portion at the forward end thereof, a similar though wider portion at the rear end thereof, vertical apertures in both said forward and rearward leg portions forming slideways for guide rods included in a reciprocable assembly manually operable by means of a pair of diametrically opposed handlebars rigid with a knob member permanently secured to a rotatable shaft the end portions of which are supported in the leg portions of said U-shaped member.

6. Apparatus including means for removably securing same to the free end portion of a reciprocatory shaft incorporated in the mechanism of a suitable agitation device, said apparatus including a pair of spaced bed members provided with a series of spaced alined recesses each adapted to snugly receive the lowermost portion of a cream container, a manifold block supporting a series of similarly spaced and alined assemblies for injecting gas under pressure into each container simultaneously with the reciprocation thereof, a horizontally disposed shaft rotatably supported at either end in a substantially U-shaped member wherein are provided vertical slideways adapted to receive guide rods depending from the manifold block, a knob affixed to one end of said shaft, a pair of diametrically opposed handlebars rigid with said knob for manual rotation of the shaft aforesaid, and one or more linkages interposed between said shaft and a non-rotary shaft extending through said manifold block.

FRED F. SUELLENTROP.

REFERENCES CITED

The following references are of record in the file of this patent:

UNITED STATES PATENTS

| Number | Name | Date |
|---|---|---|
| 1,126,865 | Read | Feb. 2, 1915 |